(No Model.) H. C. SMITH. 2 Sheets—Sheet 1.
SAFETY HOOK.
No. 307,596. Patented Nov. 4, 1884.
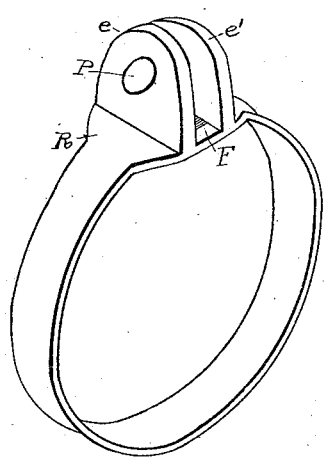
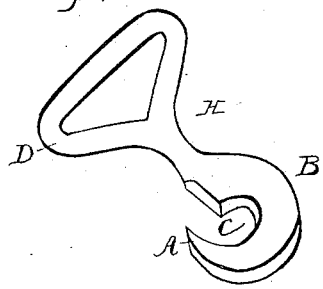
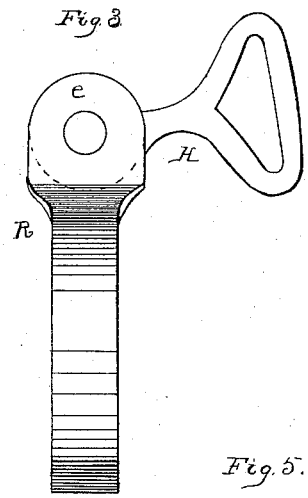
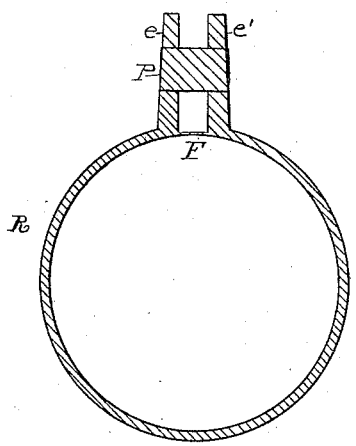
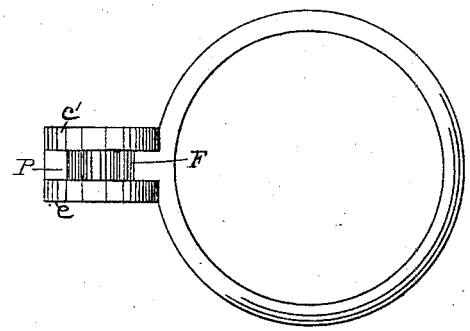
Witnesses.
John T. Booth
N. Davenport
Inventor.
H. C. Smith
by Geo. A. Mosher
Atty.

(No Model.) 2 Sheets—Sheet 2.
H. C. SMITH.
SAFETY HOOK.
No. 307,596. Patented Nov. 4, 1884.
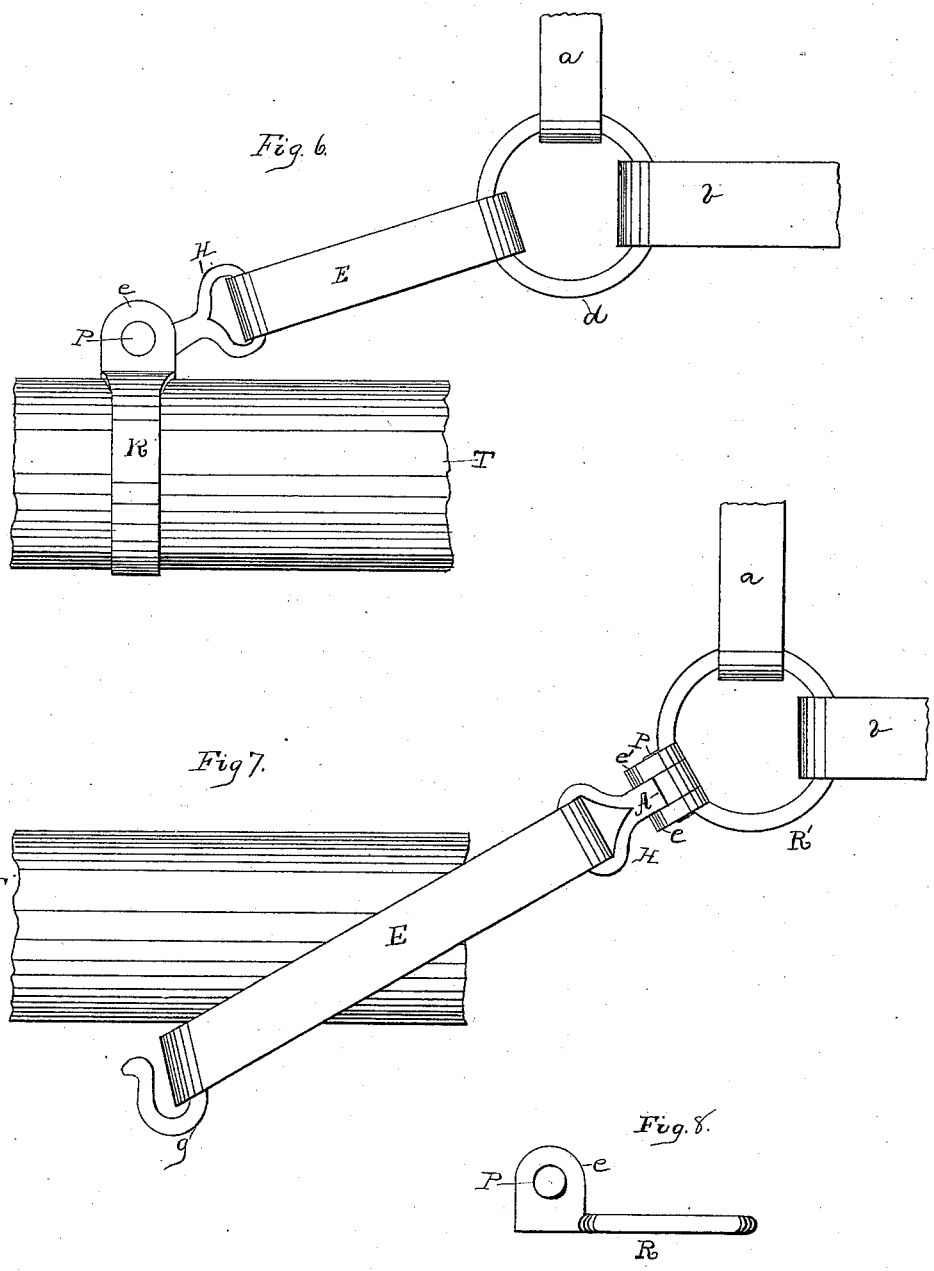

UNITED STATES PATENT OFFICE.

HENRY COLBORNE SMITH, OF WEST TROY, NEW YORK.

SAFETY-HOOK.

SPECIFICATION forming part of Letters Patent No. 307,596, dated November 4, 1884.

Application filed June 11, 1884. (No model.)

*To all whom it may concern:*

Be it known that I, HENRY COLBORNE SMITH, a resident of West Troy, in the county of Albany and State of New York, have invented certain new and useful Improvements in Safety-Hooks; and I do hereby declare that the following is a full, clear, and exact description of the invention, that will enable others skilled in the art to which it appertains to make and use the same, reference being had to the accompanying drawings, and to the letters of reference marked thereon, which form a part of this specification.

Similar letters refer to similar parts in the several figures therein.

My invention relates to improvements in safety-hooks; and it consists in providing a hook and eye shaped to engage and disengage with each other in one position only relatively to each other, and to form a pivotal joint when in engagement, as hereinafter more fully described.

The object of my invention is to provide a safety-hook which may be easily and quickly secured to or removed from its eye without the intervention of springs, and in a manner such that it will not rattle, and more particularly to adapt the same for use in connecting harness with vehicles.

Figure 1 of the drawings is a view in perspective of the eye having a ring adapted to be secured to a vehicle-thill, as shown in Fig. 6. Fig. 2 is a perspective of the hook detached. Fig. 3 is a side elevation of the hook attached to its eye. Fig. 4 is a central vertical section of eye and ring shown in Fig. 1. Fig. 5 is a plan view of eye with modified form of ring. Fig. 6 is a side elevation of portions of a thill and harness connected by my improved hook and eye. Fig. 7 is a side view of same, showing the eye and ring upon the harness instead of on the thill. Fig. 8 is a side elevation of the eye and ring shown in Fig. 5.

H is the hook shown in perspective in Fig. 2, provided at one end with the wedge-shaped hook A, which gradually thickens, forming the circular back B and opening C, and at the other end with the bar D, adapted to receive a strap, E. The eye adapted to receive the hook consists of a plate provided with ring R, by which it may be secured to a thill, T, of a vehicle, and with the projecting ears $e\ e'$, which are connected near their centers by the bar or pivot P. The plate is also provided with a circular depression, F, between the ears, adapted to fit the form B of the hook. (Shown by the position of the dotted lines in Fig. 3 and in Figs. 1, 4, and 5.) When it is desired to insert the hook in its eye, the two parts are brought together in the positions relative to each other shown in Figs. 1 and 2, except that the back B is raised so as to be almost vertically over the edge of wedge A. The wedge A is then inserted between the ears $e\ e'$ and between the pivot P and depression F until the pivot occupies the opening C in the hook. The end D of the hook is then turned over to the position shown in Fig. 3, which forces the thicker portion of the hook at B down into the depression F, where it is firmly held by the pivot P, which effectually prevents the hook from being removed until it is turned back to the position occupied when inserted in the eye, and where it is securely prevented from rattling within or upon the eye.

In Figs. 6 and 7 I show the application of my invention to the holdback of a harness. $a$ and $b$ are breech-bands of the harness, sustaining the ring $d$ in Fig. 6, to which the hook is attached by the strap E, the eye being secured to thill T by ring R.

In Fig. 7 the eye forms part of the ring R', and the hook is connected with the thill T by the strap E engaging with hook $g$. In the latter case the ears $e\ e'$ project at right angles to the plane of the ring, as shown in Fig. 8, instead of in line therewith, as shown in Figs. 6 and 7. I am thus able to cheaply construct a strong and durable safety-hook that will not rattle, and without the use of springs to retain the same within its eye.

What I claim as new, and desire to secure by Letters Patent, is—

A circular hook with a wedge-shaped point and strap-attaching loop, in combination with a plate having projecting pivot-supports $e\ e'$, hook-retaining pivot P, depression F, fitting the back B of said hook, and a ring or analogous device for attaching the same to a thill or harness, substantially as described, and for the purposes set forth.

In testimony whereof I have hereunto set my hand this 6th day of March, 1884.

HENRY COLBORNE SMITH.

Witnesses:
GEO. A. MOSHER,
W. H. HOLLISTER, Jr.